United States Patent [19]

Galtz et al.

[11] Patent Number: 4,688,718
[45] Date of Patent: Aug. 25, 1987

[54] INTERMEDIATE HOUSING FOR A FUEL-OPERATED HEATER

[75] Inventors: Ruediger Galtz, Munich; Dieter Goerlich, Emmering; Alois Reichensdoerfer, Krailling, all of Fed. Rep. of Germany

[73] Assignee: Webasto-Werk W. Baier GmbH & Co., Gauting, Fed. Rep. of Germany

[21] Appl. No.: 840,052

[22] Filed: Mar. 17, 1986

[30] Foreign Application Priority Data

Mar. 15, 1985 [DE] Fed. Rep. of Germany ....... 3509347

[51] Int. Cl.⁴ .............................................. B60H 1/02
[52] U.S. Cl. ........................... 237/12.3 C; 126/110 B; 432/222
[58] Field of Search ................... 237/12.3 R, 12.3 C; 126/110 B, 116 R; 432/222

[56] References Cited

U.S. PATENT DOCUMENTS 3,779,229 12/1973 Volbehr ........................ 126/116 R
3,989,029 11/1976 Friedl et al. .................... 126/110 B
4,216,759 8/1980 Friedl et al. .................... 126/110 B Primary Examiner—Henry A. Bennet
Attorney, Agent, or Firm—Sixbey, Friedman & Leedom

[57] ABSTRACT

An intermediate housing that is, preferably, developed as a cast part and combines several functions and objectives in itself. The intermediate housing not only houses a driving motor for a combustion air blower and a heating air fan, but the driving motor is also disposed by means of a circumferential support developed in the intermediate housing which, at the same time, serves as a stop during the mounting. By means of an elastic bearing of the driving motor, structure-born noise transmission can be avoided. On one side, a combustion air intake connection piece, a fuel supply pipe receiving opening and an exhaust gas outlet connection piece are integrally formed. For the mounting of the heater at a mounting arrangement, the intermediate housing also has passages for fastening screws that are accessible from the direction of the top side of the heater. A receiving space, that is tightly closable by means of a cap, is provided for containing the electrical supply devices, and an ignition device and a flame detector are also housed in the receiving space. In addition, casing parts of the heater can also be fastened to the intermediate housing. At the outer surface of the intermediate housing, axially extending cooling ribs are formed that have an interrupted axial course and are circumferentially staggered with respect to one another.

21 Claims, 5 Drawing Figures

INTERMEDIATE HOUSING FOR A FUEL-OPERATED HEATER

BACKGROUND AND SUMMARY OF THE INVENTION

This invention relates to an intermediate housing for a fuel-operated heater that, in particular, is intended as an auxiliary heater for vehicles.

From German Pat. No. 24 32 850, a fuel-operated heater for vehicles is known that has an intermediate housing of the initially mentioned type. A driving motor, a combustion air blower driven by it, starting and control devices and a burner unit are housed in this intermediate housing. In this case, the driving motor at both of its axially opposite ends is disposed in the intermediate housing. In addition, a heat exchanger can be mounted to the intermediate housing as an axial extension of said housing via a fastening flange, said heat exchanger concentrically surrounding a combustion chamber. An exhaust gas outlet connection piece is a portion of the part of the heater forming the heat exchanger.

This invention has the objective of providing an intermediate housing for a heater of the initially mentioned type that combines several functions in itself and that serves as a central connecting unit for the combustion air blower, the fuel supply and for the exhaust gas discharge as well as for the ignition device and other electrically powered components. In addition, the intermediate housing according to the invention has the purpose of making possible a fast and simple mounting of the heater via a mounting arrangement that is connected firmly with a vehicle. In this case, especially an extremely compact and space-saving construction of the heater as a whole is to be achieved.

According to the invention, the intermediate housing is developed in such a way that a unit consisting of the driving motor and a combustion air blower, that is preferably a side-channel blower, is mounted to the intermediate housing directly at a combustion air blower end thereof via an interposed elastic element. For this purpose, a circumferential support is developed in the intermediate housing that has a conical shape and serves as a stop during the axial insertion of the unit consisting of the driving motor and the combustion air blower. The axially opposite end of the driving motor, or of this unit, is also elastically mounted, such as by a motor cap fastened at the intermediate housing that interacts with an elastic element that is preferably arranged at the corresponding end of the driving motor. Preferably, the elastic elements are rings and permit, at the same time, a sealing of the bearing points. In the case of the intermediate housing, the bearing surface for the unit consisting of the driving motor and the combustion air blower is formed directly by it.

In addition, the elastic bearing of this unit prevents a direct structure-borne noise transmission to the intermediate housing, and the intermediate housing permits, in conjunction with the motor cap, an encased housing of the driving motor and of the combustion air blower resulting in an operation of such a heater that makes very little noise.

According to the another aspect of the invention, the intermediate housing is designed in such a way that, on one side of the intermediate housing, the combustion air intake connection piece, the fuel feed line receiving opening and the exhaust gas outlet connection piece are formed axially one behind the other as close as possible. Since in the intermediate housing the connections for the combustion air supply system, the fuel supply system and for the exhaust gas discharge are integrated and are arranged as close to one another as possible, not only the mounting of such a heater in connection with a mounting arrangement is facilitated, but especially also the development of the heat exchanger is simplified because, in this case, the connections, such as for the exhaust gas discharge, do not have to be taken into account.

Preferably in the area of the outer surface of the intermediate housing, around the supply and discharge connections, support feet are also formed that, at the same time, interact with a mounting arrangement that can be attached to the vehicle. These support feet form supporting points for the heater and are distributed over a surface that is as large as possible in order to provide support, at the mounting arrangement, that is secure with respect to tilting. A safety device for the heater may also be provided that is preferably developed as a contact-actuated auxiliary switch and interacts with the mounting arrangement in such a way that, when the heater is detached from the mounting arrangement, the heater is forcibly switched off by the safety device for the heater. This also takes into account the safety requirements with respect to heaters of this type that are becoming stricter in general.

According to a preferred embodiment of the invention, at the side of the intermediate housing opposite that having the combustion air, fuel and exhaust gas connections, a trough-shaped receiving space is formed in which all electrical connections and also the ignition device, as well as a flame monitoring device, can be housed. This receiving space is easily accessible so that the devices of the heater that have to be electrically energized are also easily accessible when necessary. In addition, my means of such a central arrangement of the electric connections of the heater in the intermediate housing, it is made possible that the electric components can be examined separately without any taking-apart of the heater. As a result, the operational reliability of such a heater can be improved. Preferably, this receiving space is connected with the intake space of the combustion air fan via an opening and is closed off tightly in the direction of the outside by means of a cap, that can be screwed together with the intermediate housing and that contains the counterparts of the electrical connections so that cap also, at the same time, forms a connector unit for the electrical connections and closes the receiving space in a gastight way in order to prevent an escape of combustion gases. In addition, via this space, an adjusting device for the combustion air volume is also accessible so that an adjustment of the combustion air volume provided by the combustion air blower can take place without difficulties, even though the heater is mounted in place by the mounting arrangement.

According to another advantageous development of the invention, devices are also integrated into the intermediate housing of the heater that permit the fastening of the heater to the mounting device. For this purpose, at least one passage is provided in the receiving space and another passage is provided in the intermediate housing at a corresponding aligned point, through which at least one fastening screw can be guided that connects the heater with the mounting arrangement. Preferably, for the fastening of the heater at the mounting arrangement, two fastening screws are provided that can be fitted through correspondingly developed passages in the intermediate housing. By means of this development according to the invention, the intermediate housing makes it possible that the whole heater can be fastened rapidly into the condition of usage and, if necessary, be detached again. The reason is that for the mounting and dismounting only the cap of the receiving space must be removed without the requirement that, for this purpose, outer casing parts of the heater have to be removed, and the fastening screws can then be rightened or loosened.

Advantageously, the intermediate housing also achieves the objective of serving as an attachment part for cup-shaped casing parts or casing halves that are preferably formed of sheet metal and which, by means of sheet-metal screws, can be fastened to the intermediate housing.

According to another advantageous development of the invention, the intermediate housing, at its exterior surface, carries axially extending cooling ribs, the axial course of which is preferably interrupted by the fact that the cooling ribs are arranged staggered with respect to one another in a circumferential direction. The cooling ribs that are located in proximity of the fastening flange for the heat exchanger are, therefore, set off from those cooling ribs that are arranged at the remaining part of the intermediate housing so that the residual heat from the heat exchanger is not distributed along the whole length of the housing and the heat transfer of the heat exchanger can be designed to be more efficient.

As demonstrated, the intermediate housing according to the invention permits the putting-together of several different functions in one combination in such a way that it serves as a central connection unit for the electrical parts as well as a bearing for the driving motor and also for the attachment of the heater to a mounting arrangement. As a result, surprising simplifications are obtained with respect to the construction and the mounting of a heater having such an intermediate housing.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
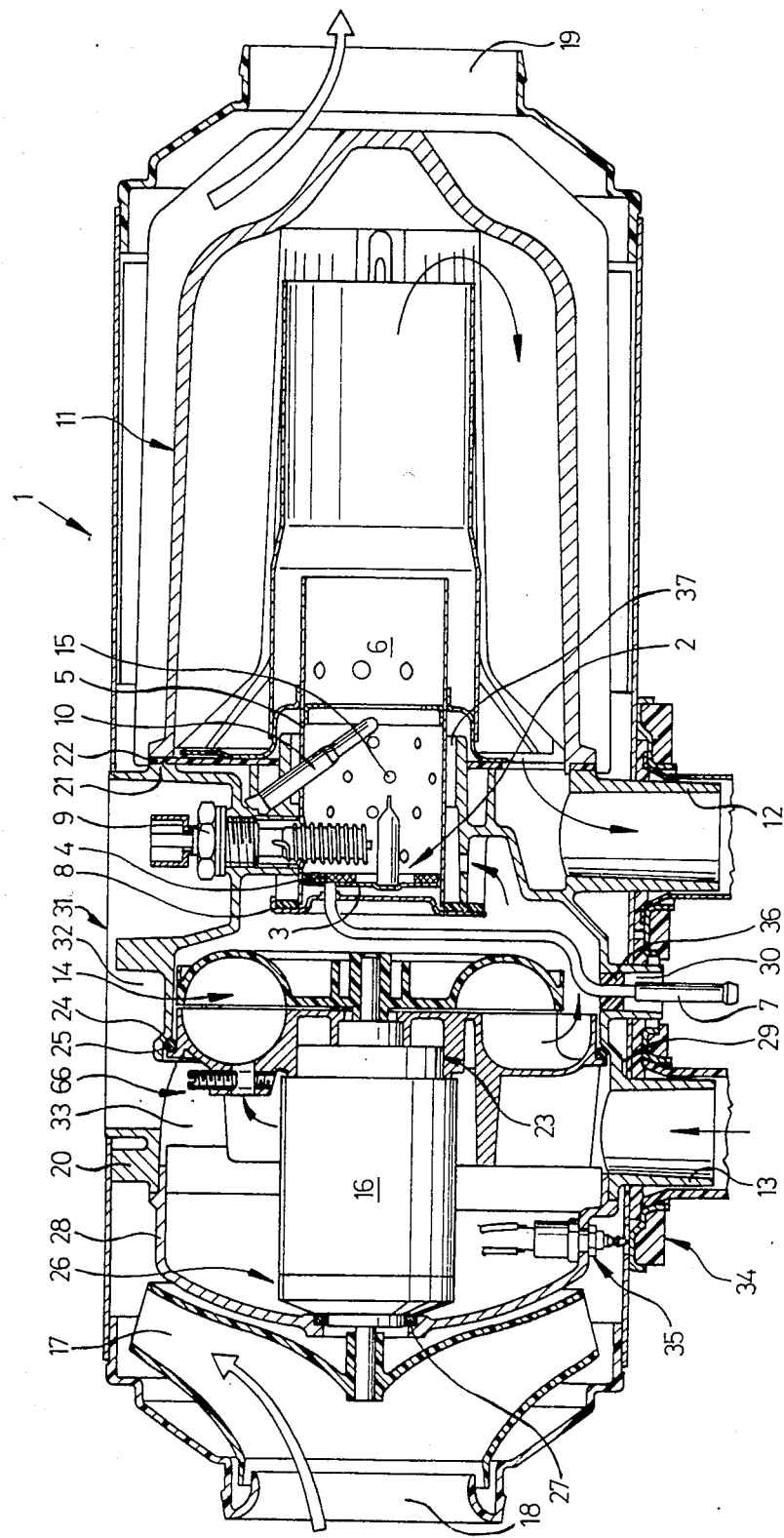
FIG. 1 is a longitudinal sectional view of a heater incorporating an intermediate housing in accordance with the invention.

FIG. 1 is a longitudinal section of a heater that can be used, for example, as an auxiliary heater for a motor vehicle and that, as a whole, has the reference number 1. An auxiliary heater is shown as an example. The heater 1 has a burner unit 2 that is a liquid fuel burner that has an absorbent body 4 on a carrier means 3 that projects into a combustion chamber 6 of the heater 1 which is formed by a combustion pipe 5. The burner unit 2, via a fuel supply pipe 7, is preferably supplied with liquid fuel that is led through a cover closing the combustion chamber. As an ignition device, a glow plug 9 also projects into the combustion chamber 6, as well as a flame monitor 10.

The combustion pipe 5 is coaxially surrounded by a heater exchanger 11 through which the hot combustion gases coming out of the combustion chamber 6 are guided, after they are deflected at the end that is opposite the burner unit 2, and are discharged via an exhaust gas outlet connection piece 12. Via an intake connection piece 13 for combustion air, air from the surroundings is sucked into a combustion air blower 14 that, in the case of the illustrated embodiment, is formed by a side channel blower. The combustion air blower 14 delivers the combustion air drawn in thereby, via inlet openings 15, into the combustion chamber 6, in which case the combustion air in the area of the burner unit 2 is introduced for the forming of a combustible mixture with the fuel evaporated from the absorbent body 4. The combustion air blower 14 is driven by a motor 16 that also drives a heating air fan 17. Ambient air enters into the heating air fan 17 via an inlet 18, said ambient air being heated by the heat exchanger 11 and leaving the heater 1 via an outlet 19 that is arranged so that it is coaxially opposite inlet 18. The thus heated heating air is then led into a space to be heated, such as a passenger compartment of a motor vehicle.

The heater 1 has an intermediate housing 20 that is formed as a cast part to which the heat exchanger 11 is mounted via a fastening flange 21 with an intermediate seal or insulation ring 22 disposed therebetween. In the intermediate housing 20, the burner unit 2, the combustion air blower 14 and the driving motor 16 are housed. The driving motor 16 is elastically supported in multifunctionally designed intermediate housing 20 in order to reduce structure-born noise transmission and to ensure an operation of the heater 1 that is as quiet as possible. For this purpose, an end 23 of the driving motor 16 for driving connection to the combustion air blower, together with the combustion air blower 14, is received by a circumferential support 24 formed by the intermediate housing 20, and a sealing ring 25 is arranged as an elastic element between the circumferential support 24 and blower housing part carrying end 23 of motor 16. The end 26 of the driving motor 16 that faces the heating air fan 17 is disposed in a motor cap 28. An element developed as a ring seal 27 is located inbetween motor cap 28 and motor end 26. The motor cap 28 is designed to be fastened to the intermediate housing 20, for example, by means of screws that are not shown.

In addition, all flow connections are integrally cast parts of the intermediate housing 20. According to FIG. 1, a connection side 29 is on the bottom, and at this connection side 29, the combustion air intake connection piece 13, a receiving opening 30 for the fuel supply pipe 7 and the exhaust gas outlet connection piece 12 are arranged in this sequence axially one behind the other.

On the side 31 of the intermediate housing 20 that is opposite the connection side 29, i.e., at the side that is on top in FIG. 1, a trough-shaped receiving space 32 is formed in which the glow plug 9, the flame monitor 10 as well as unillustrated electrical connections for the driving motor 16 and the control device are housed. This receiving space 32 therefore houses all important operating units of the heater and, via a passage 33, is connected with the intake side of the combustion air blower 14 in order to, if necessary, draw exhaust gases entering into the receiving space 32 out from the receiving space 32 toward the combustion air blower 14. Also accessible via the receiving space 32 is an adjusting device 66 for regulating the combustion air volume. As FIG. 1 also shows, a mounting arrangement 34 is provided at the connection side 29 that may, for example, be fastened to a vehicle and contains passages for the combustion air intake connection piece 13, the receiving opening 30 for the fuel supply pipe 7 and the exhaust gas outlet connection piece 12.

FIG. 1 also shows a safety device 35 for the heater that is developed as a contact-actuated auxiliary switch and switches off the heater 1 as a whole for reasons of safety when the heater 1, for whatever reasons, detaches itself from the mounting arrangement 34. The heater safety device 35 is mounted in the motor cap 28 and is located on the connection side 29 of the intermediate housing 20 so as to engage and be switched on by the mounting arrangement 34 when the heater is properly mounted.

As also shown in FIG. 1, burner unit 2 comprises the cover 8, the fuel supply pipe 7 and the carrier 3 with the absorbent body 4 arranged on it and is designed so that, after the dismounting of the unit comprised of the driving motor 16 with the combustion air blower 14 and the heating air fan 17 from the intermediate housing burning unit 2, can be exchanged easily and rapidly. The fuel supply pipe 7 is inserted in the receiving opening 30 in the intermediate housing 20 and sealingly held in position using an elastic stopper 36 so that, after the detachment of the burner unit 2 from the combustion pipe 5, there is sufficient space in order to pull this unit, in an axial direction, out of the combustion chamber 6 formed by the combustion pipe 5. As shown, the combustion pipe 5 is also supported in an axial opening 37 of the intermediate housing 20.

In the following, details of the intermediate housing 20 will be explained by means of FIGS. 2 and 3. Parts that are similar or identical to those of the heater of FIG. 1, in this case have the same reference numbers.

Figure 2:
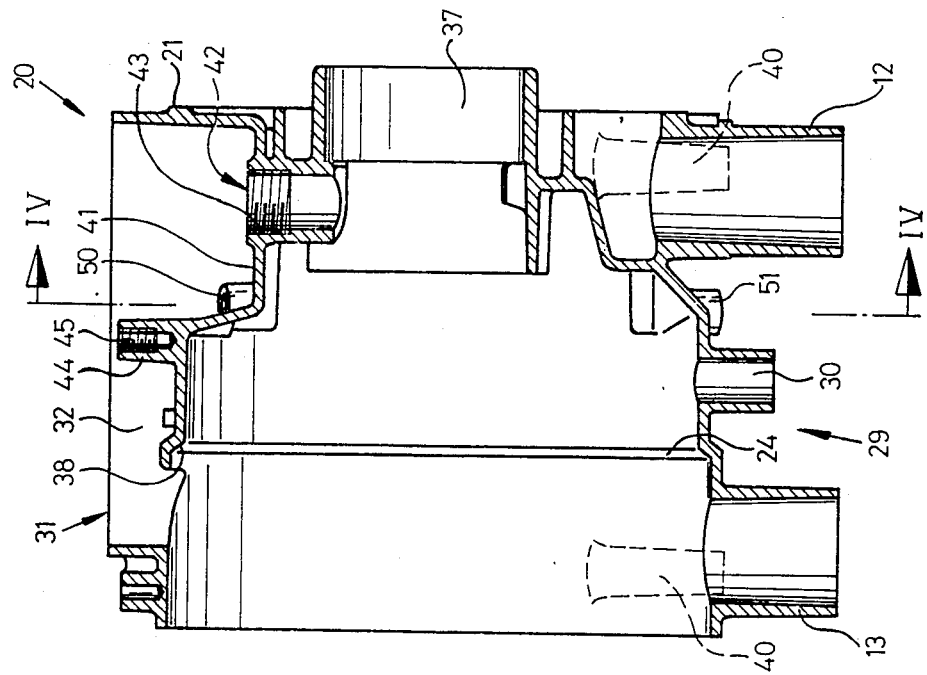
FIG. 2 is a longitudinal sectional view of the intermediate housing of the heater of FIG. 1 alone.

FIG. 2 is a longitudinal section of the intermediate housing 20, removed from the heater 2 according to FIG. 1. The circumferential support 24 for the bearing of the driving motor 16 extends over the whole circumference of the intermediate housing 20 and is developed in the shape of a step-shaped conically developed shoulder 38. The sealing ring 25 is placed on this step-shaped shoulder 38 and said sealing ring 25 is held by this shoulder 38 during mounting. However, the circumferential support 24 is also developed in such a way that it serves as a stop when the driving motor 16, with the combustion air blower 14 combined with it to form a unit, is inserted into the interior of the intermediate housing 20.

In the area of the connection side 29, a support foot 40 is formed on each side of the intermediate housing 20 (FIG. 3) in the vicinity of air intake connection piece 13 and also of the exhaust gas outlet connection piece 12 (broken lines FIG. 2). Thus, it can be recognized that a total of four support feet 40 of this type are shaped onto the intermediate housing 20. Furthermore, it is noted that these feet 40 interact with the mounting arrangement 34, shown in FIG. 1, and serve as support points on the mounting arrangement 34. By having feet 40 arranged on the connection side 29 of the intermediate housing 20 in such a way that an area is formed between them that is as large as possible, their interaction with the mounting arrangement 34 ensures that the heater is safe with respect to tilting.

An axial opening 37 is formed in the center of the intermediate housing 20 into which the combustion pipe 5 is inserted (as shown in FIG. 1), and on the right front side of the intermediate housing 20 according to FIG. 2 the fastening flange 21 is provided for the heat exchanger 11 shown in FIG. 1, said fastening flange 21 being formed as a unitary portion of the intermediate housing 20.

On the side 31 of the intermediate housing 20 that is opposite the connection side 29, the trough-shaped receiving space 32 is formed. The wall 41 defining the bottom of the receiving space 32 is provided with a receiving opening 42 for the glow plug 9 (see FIG. 1), a thread 43 being cut into said receiving opening 42 for the screwing-in of the glow plug 9. Within receiving space 32, approximately in the center, a web 44 is arranged that has a threaded opening 45 that serves for the screw fastening of the cap 46 shown in detail in FIGS. 4 and 5, said cap 46 tightly closing off the trough-shaped receiving space 32 toward the outside.

Figure 3:
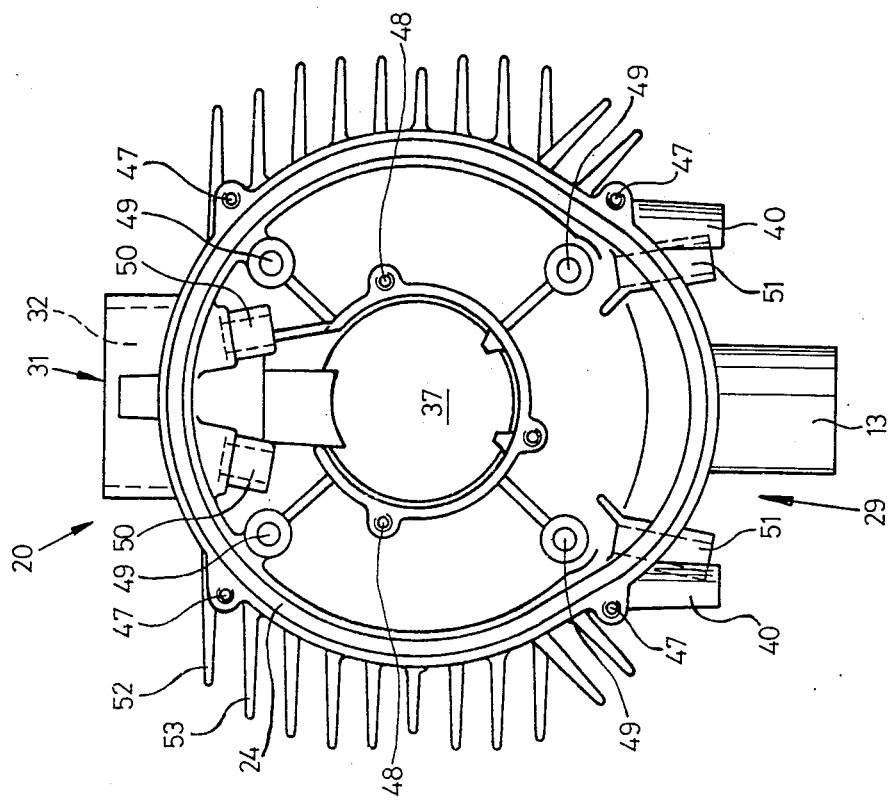
FIG. 3 is an end view of the intermediate housing according to FIG. 2 as seen from the left therein.

FIG. 3 shows the intermediate housing 20 in a view from the left according to FIG. 2 and exhibits the distribution over its circumference of openings 47 that are used for the screwing-on of the motor cap 28 shown in FIG. 1. Around the axial opening 37 that receives the combustion pipe 5, openings 48 are provided for the screws used to fasten the cover 8, shown in FIG. 1, that forms part of the burner unit 2 and carries the fuel supply pipe 7. In the area of the fastening flange 21 (see FIG. 2), openings 49 are developed on the intermediate housing 20 that are distributed over the circumference, said openings 49 serving for the screw fastening of the heat exchanger 11 (FIG. 11).

In the area of the bottom wall 41 of the receiving space 32, two passages 50 are formed which define an acute angle with respect to a vertical center plane of the housing 20 and with respect to one another. Passages 51 are formed on the connection side 29 of the intermediate housing 20 in alignment with these passages 50. Fastening screws 56, one of which is shown in FIG. 4, are inserted through these aligned passages 50 and 51, said fastening screws serving for the fastening of the heater 1 to the mounting arrangement 34.

As shown in FIG. 3, the intermediate housing 20 has cooling ribs 52 and 53 that are unitarily formed onto its outer surface and extending axially therealong. The cooling ribs designated by the reference numeral 52 extend at the outer side of the intermediate housing 20 approximately from the fastening flange 21 for the heat exchanger 11 along the axial opening 37. Those cooling ribs having the reference numeral 53 extend over the remaining part of the intermediate housing 20, i.e., to the end that faces the motor cap 28 shown in FIG. 1. As can be determined especially from FIG. 3 in conjunction with FIG. 5, the cooling ribs 52 and 53 are arranged so that they are staggered with respect to one another in a circumferential direction so that they all are visible viewed in an axial direction but, when viewed from the side of the intermediate housing 20, their axial course is interrupted. By means of this interruption, a direct physical carrying-off of heat from the end of the intermediate housing 20 facing the combustion chamber 6, that is relatively warm, to the axially opposite end of the intermediate housing 20 is prevented. The cooling ribs 52 and 53 are arranged in parallel, with the exception of those cooling ribs 52, 53 that are arranged in proximity of the support feet 40 at the connection side 29 of the intermediate housing 20.

Figure 4:
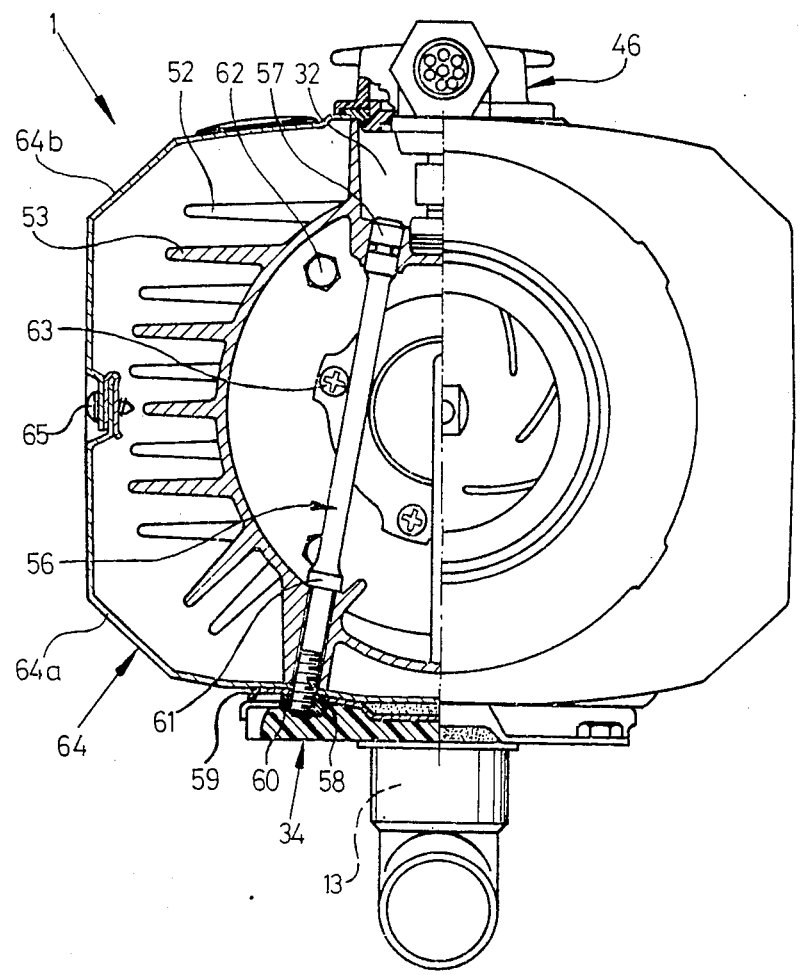
FIG. 4 is a left end view of the heater of FIG. 5, the left half of which is shown in a section taken along the line IV—IV of FIG. 2, and the heater being shown when it is attached to a mounting arrangement.

The left, sectional, half of the end view according FIG. 4 shows one of the fastening screws 56 which pass through the passages 50 and 51 in the intermediate housing 20. In a corresponding way, naturally, a fastening screw is also led through another two aligned passages 50 and 51, located in mirror-image relationship to that shown, at the right side of the vertical center plane. The fastening screw 56, at its end facing the mounting arrangement 34, has a thread section 58 onto which a nut 60 is screwed that is disposed behind, i.e., on the underside of, an upper flexible sheet-metal covering 59 of the mounting arrangement. The fastening screw 56 also has a stepped shoulder 61 that, in the fully mounted condition of the heater 1 according to FIG. 4, rests against the interior surface of the housing containing passage 51 as an abutting surface. The fastening screws 56 are inserted via the trough-shaped receiving space 32, and the heads 57 of the fastening screws 56 are accessible from the trough-shaped receiving space 32 when the cap 46 is removed.

Therefore, the heater 1 can be mounted very rapidly and easily to the mounting arrangement 34 by using only, for example, two fastening screws 56, the heads 57 of which are accessible without impairment when the cap 46, that tightly closes the trough-shaped receiving space 32 of the intermediate housing 20, is removed. The fastening screws 56 pull the upper sheet-metal covering 59 of the mounting arrangement 34 against the heater 1, namely, preferably, with a predetermined prestressing in order to preload the heater safety device 35, shown in FIGS. 1 and 5, in such a way that it is ineffective, i.e., its contact is depressed and the heater made operative. However, this heater safety device 35 will switch off the heater 1 as soon as the fastening screws 56 are loosened and the upper sheet-metal covering 59 of the mounting arrangement 34 springs back.

In FIG. 4, fastening screws for the mounting of the heat exchanger 11 at the intermediate housing 20 have the reference number 62, and fastening screws for the screwed connection of the cover 8 and the burner unit 2 have the reference number 63.

Figure 5:
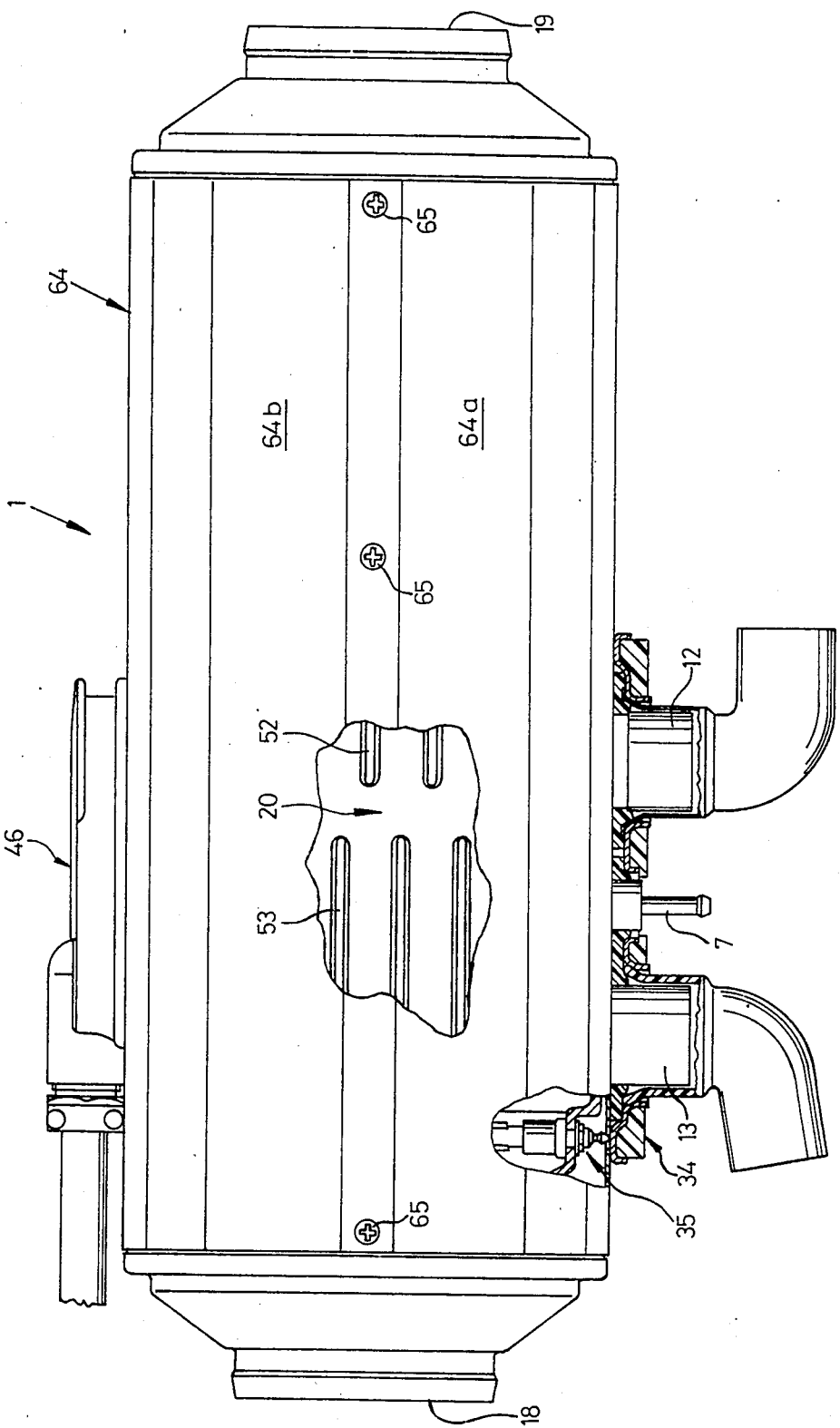
FIG. 5 is a side view of the heater connected with a mounting arrangement, shown partially in section and partially broken away.

As FIGS. 4 and 5 also show, the intermediate housing 20 and the heat exchanger 11 as well as the heating air fan 17 are surrounded by a casing 64 that is preferably formed of channel-type casing halves 64a, 64b that, by means of sheet-metal screws 65, can be fastened to the intermediate housing 20.

FIGS. 4 and 5, as a detail, also show the cap 46 that tightly closes the trough-shaped receiving space 32 toward the outside. This cap 46, advantageously, contains the counterparts of the electrical connections for the devices housed in the intermediate housing 20. Thus, the intermediate housing 20, in interaction with the cap 46, also serves as a central electrical connecting device of the heater 1. Sealing means on the cap 46 interact with the trough-shaped receiving space 32 in the intermediate housing 20 so that the receiving space 32 is closed off in a gas-tight manner.

As shown especially in FIGS. 1 and 2, the receiving space 32, via the passage 33, is connected with the suction side of the combustion air blower 14. Thus, in view of the receiving space being tightly closed by the cap 46, an escape of combustion exhaust gases toward the outside is prevented, any such gases entering space 32 being drawn out through passage 33 by blower 14. In the cap 46, that also forms a connector unit, the electrical current supply cable is also integrated so that, after the removal of the cap 46, the heater 1, without impairment by the electrical connections, by itself may also be handled, for example, for repair and/or inspection purposes.

FIG. 5, again, shows the heater safety device 35 that interacts with the mounting arrangement 34. In addition, FIG. 5 also shows the axially interrupted course of the cooling ribs 52, 53.

As demonstrated by the above statements, several important functions are combined in the intermediate housing 20 of the heater 1. On the one hand, the intermediate housing 20, on one side, contains all electrical connections for the devices of the heater 1 that are to be energized by electricity, and, on the other hand, the intake connection piece 13 for the combustion air, the fuel supply system for the heater via the fuel supply pipe 7 and the exhaust gas outlet connection piece 20 are combined, at another side.

In addition, the intermediate housing 20, however, also serves as a central mounting and bearing unit because it contains the fastening flange 21 for the heat exchanger 11, receiving devices as well as the axial opening 37 for the combustion pipe 5 and the burner unit 2, bearing devices for the driving motor 16 as well as the circumferential support 24, and a fastening point for the motor cap 28. Furthermore, also those fastening devices, such as passages 50, 51 are integrated into the intermediate housing by means of which the heater 1 can be fastened at the mounting arrangement 34. Also, the intermediate housing 20 has fastening points for the cup-shaped casing halves 64a, 64b of the heater 1.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. An intermediate housing for a fuel-operated heater, particularly an auxiliary heater for a vehicle, of the type having an intake connection piece for combustion air, a receiving opening for a fuel supply pipe for supplying a burner unit with fuel, a fastening flange for a heat exchanger, a receiving space for a driving motor with a combustion air blower and also driving a heating air fan, and a receiving space for the burner unit, wherein the driving motor with the combustion air blower is supported, at an end thereof at which the combustion air blower is disposed, by means of a circumferential support formed in the intermediate housing with a first elastic element being located there-between, and at an opposite end of the driving motor a motor cap is disposed which is fastenable to the intermediate housing and which supports said opposite end with a second elastic element located there-between.

2. An intermediate housing according to claim 1, wherein the first and second elastic elements are rings.

3. An intermediate housing for a fuel-operated heater, particularly an auxiliary heater for a motor vehicle, of the type having an intake connection piece for combustion air, a fuel supply pipe for the supplying of a burner unit with fuel, a fastening flange for a heat exchanger, a receiving space for a driving motor with a combustion air blower and also driving a heating air fan, and a receiving space for the burner unit, wherein the combustion air intake connection piece, and an exhaust gas outlet connection piece are formed as unitary parts of the intermediate housing, at a connection side thereof.

4. An intermediate housing according to claim 3, wherein, in an area of the outer surface of the intermediate housing in the area of the combustion air intake connection piece and the exhaust gas outlet connection piece, support feet are formed as part of the intermediate housing for a mounting arrangement of the heater.

5. An intermediate housing according to claim 4, wherein a heater safety device is provided in the intermediate housing that interacts with the mounting arrangement, when the heater is mounted, and which switches off the heater in the case of a detachment of the heater from the mounting arrangement.

6. An intermediate housing according to claim 5, wherein the heater safety device is developed as a contact-actuated auxiliary switch.

7. An intermediate housing according to claim 3, wherein radially opposite the connection side of the intermediate housing, a trough-shaped receiving space is formed in which an ignition device, a flame detector device and all electrical connections can be housed.

8. An intermediate housing according to claim 7, wherein a cap that contains counterparts of the electrical connections within the trough-shaped receiving space is provided for tightly closing the trough-shaped receiving space.

9. An intermediate housing according to claim 7, wherein an adjusting device for the combustion air volume is accessible via said trough-shaped receiving space.

10. An intermediate housing according to claim 7, wherein at least one screw passage is provided in the trough-shaped receiving space and a correspondingly aligned screw passage is provided at the connection side of the intermediate housing, facing the mounting arrangement, said screw passages serving for the leading-through of a respective fastening screw for the fastening of the heater to the mounting arrangement.

11. An intermediate housing according to claim 10, wherein, for the fastening of the heater to the mounting arrangement, two fastening screws are provided that can be led through respective screw and aligned screw passages in the intermediate housing and are accessible via the trough-shaped receiving space.

12. An intermediate housing according to claim 10, wherein each fastening screw pulls the mounting arrangement so as to apply a predetermined prestressing to the heater sufficient to render inoperative a contact actuated safety switch mounted to the intermediate housing and serving for switching off the heater when rendered operative upon disengagement of the heater from the mounting arrangement.

13. An intermediate housing according to claim 3, wherein means for fastening cup shaped casing halves to the intermediate housing is provided.

14. An intermediate housing according to claim 3, wherein the outer surface of the intermediate housing is formed with axially extending cooling ribs.

15. An intermediate housing according to claim 14, wherein the axial course of the cooling ribs is interrupted between the fastening flange for the heat exchanger and the remaining part of the intermediate housing.

16. An intermediate housing according to claim 15, wherein, for the interruption of the course of the cooling ribs, the cooling ribs are formed in axial spaced sets that are also staggered with respect to one another in a circumferential direction.

17. An intermediate housing according to claim 3, wherein the driving motor with the combustion air blower is supported, at an end thereof at which the combustion air blower is disposed, by means of a circumferential support formed in the intermediate housing with a first elastic element being located there-between, and at an opposite end of the driving motor a motor cap is disposed which is fastenable to the intermediate housing and which supports said opposite end with a second elastic element located there-between.

18. An intermediate housing according to claim 17, wherein the first and second elastic elements are rings.

19. An intermediate housing according to claim 7, wherein the driving motor with the combustion air blower is supported, at an end thereof at which the combustion air blower is disposed, by means of a circumferential support formed in the intermediate housing with a first elastic element being located there-between, and at an opposite end of the driving motor a motor cap is disposed which is fastenable to the intermediate housing and which supports said opposite end with a second elastic element located there-between.

20. An intermediate housing according to claim 1, wherein the first and second elastic elements are rings.

21. An intermediate housing according to claim 3, wherein a receiving opening for said fuel supply pipe is additionally provided as a unitary part of the intermediate housing, at the connection side thereof.

* * * * *